Oct. 9, 1951     M. E. LANGE     2,571,043

MACHINE TOOL

Filed Dec. 15, 1945

INVENTOR.

Max E. Lange

BY Kwis, Hudson, Boughton & Williams
ATTORNEYS

Patented Oct. 9, 1951

2,571,043

UNITED STATES PATENT OFFICE 2,571,043

MACHINE TOOL

Max E. Lange, Cleveland Heights, Ohio, assignor to The Warner & Swasey Company, Cleveland, Ohio, a corporation of Ohio Application December 15, 1945, Serial No. 635,212

2 Claims. (Cl. 308—3)

1

This invention relates to a machine tool and more particularly to the construction employed for mounting a slidable member of the machine tool, such as a turret slide for example, upon its support such as the ways of the bed.

An object of the invention is to provide an improved arrangement for mounting a slidable member of a machine tool upon its support and whereby provision is made for resisting the applied force due to the cutting action of the tools in such manner as to maintain the slide freely movable of the support and to eliminate the tendency of the slide and its support having a binding or gripping contact therebetween.

Another object is to provide in a machine tool having front and rear V-shaped ways upon which is mounted a slide, improved means for maintaining the slide in the correct relationship to the rear way and which means causes the forces applied to the slide and tending to lift the slide from the rear way to be resisted both upwardly and laterally of the rear way along lines normal to a horizontal surface and a vertical surface of the rear way, thus eliminating any binding action between the rear way and the slide.

Another object of the invention is to provide in a machine tool wherein the bed has a V-shaped rear way, improved gib means for holding the slide on the rear way and including an individually adjustable gib contacting a vertical surface of the way and preventing lateral movement of the slide and an individually adjustable gib located beneath and engaging a horizontal surface of the way and resisting upward displacement of the slide relative to the way, wherefore the gibs combined oppose an angularly disposed force which otherwise would tend to bind applied or lock the way and slide together due to angularly disposed contacting surfaces therebetween.

Further and additional objects and advantages not hereinbefore referred to will become apparent hereinafter during the detailed description of an embodiment of the invention which is to follow.

Referring to the accompanying drawing.

2 agrammatically illustrating the lines of force resisting the applied force and showing by dash lines the components of said lines of force.

Figure 1:
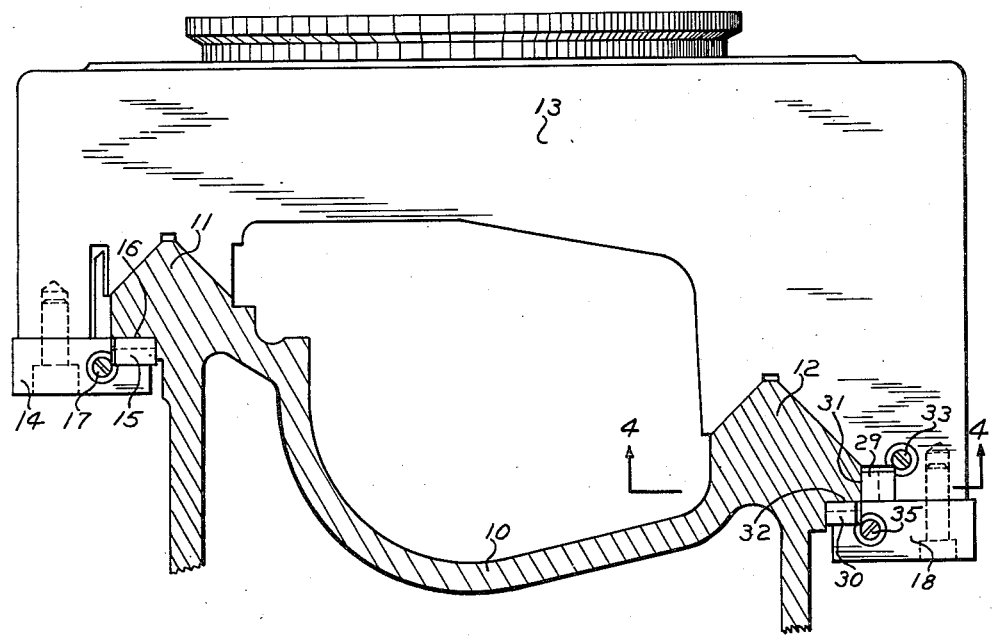
Fig. 1 is a transverse vertical sectional view through the bed of a machine tool showing in elevation a slide mounted on the ways of the bed.
Figure 3:
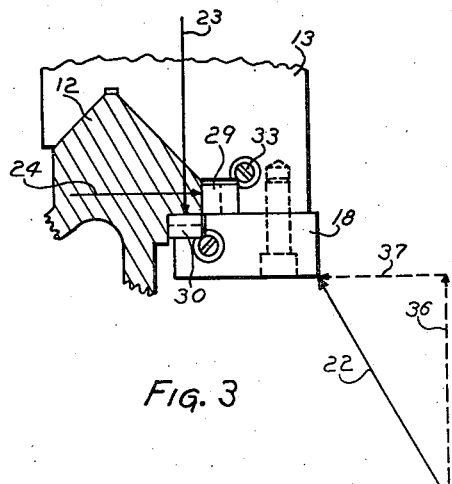
Figure 4:
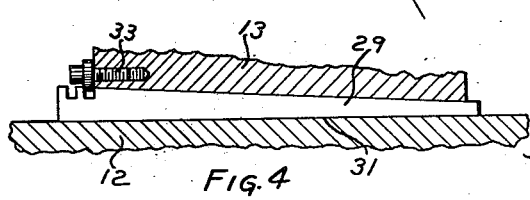

Fig. 3 is a fragmentary view of the lower right hand portion of Fig. 1 and wherein the applied force which tends to lift the slide relative to the rear way is indicated by full lines and its components by dash lines, while the lines of force which resist the applied force are indicated by full lines, and Fig. 4 is a fragmentary sectional view taken substantially on line 4—4 of Fig. 1 looking in the direction of the arrows.

Figure 2:
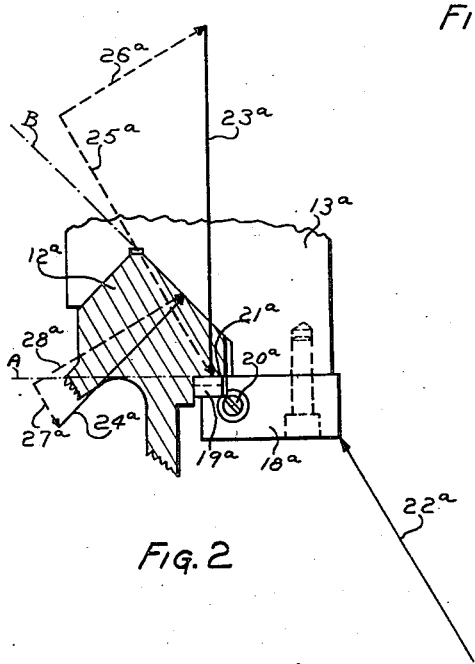
Fig. 2 is a fragmentary sectional view of a rear V-shaped way of a machine tool bed with the rear portion of a slide shown mounted thereon and which slide is provided with a single gib engaging beneath a horizontal surface on the rear of the way, this view diagrammatically illustrating the forces applied which tend to lift the slide upwardly from the rear way and also di-

Referring to Fig. 1, 10 represents the bed of a machine tool which is provided with the usual inverted V-shaped front way 11 and rear way 12 that extend parallel to each other and parallel to the work spindle in the headstock of the machine tool, not shown, but well understood in the art. The ways 11 and 12 may support one or more slides for movement there along toward and away from the headstock and in the present illustration one slide 13 is shown as so supported and said slide for purposes of illustration may be considered as a turret slide. The turret slide 13 at its front is provided with a bottom cap 14 bolted or otherwise secured to the underside of the slide and said cap extends beneath the front way 11 and is provided beneath said way and in the upper corner of the cap with a recess in which is adjustably mounted a tapered gib 15 which contacts the horizontal surface 16 on the underside of the front way 11. The tapered gib 15 is adjusted by means of an adjusting screw 17 carried by the cap 14 and operatively connected to the gib. The structure so far described is old and well known in the art. Ordinarily the slide 13 is held on the rear way 12 by means of a single gib. In Fig. 2 the usual arrangement for holding the slide on the rear way is shown and a brief description of this old arrangement will now be set forth using the exponent $a$ on the reference numerals to indicate the corresponding parts shown in Fig. 1.

The slide identified in Fig. 2 by the numeral 13a has bolted or otherwise secured to its rear underside a bottom cap 18a, similar to the cap 14 at the front of the bed and previously described. The cap 18a is provided in its upper corner beneath the rear way 12a with a recess in which is mounted a tapered gib 19a adjusted by means of an adjusting screw 20a carried by the cap 18a. The gib engages the horizontal surface 21a on the underside of the way and the purpose of the cap is to hold the rear portion of the slide in position on the rear way and to resist the tendency for the slide to tilt upwardly and forwardly during the normal operation of the machine. It will be understood by those skilled in the art that when a cutting tool carried by a face of the turret of the slide is in cutting engagement with the work piece and the spindle is rotating in the forward direction, i. e., a counterclockwise direction when viewing the spindle from the end of the slide as shown in Fig. 1, a force will be applied to the slide tending to tilt the latter upwardly and forwardly, such applied force being substantially in the direction of line 22a, depending upon the cutting action of the tool or tools carried by the turret. The applied force 22a is resisted by resultant forces represented by the full lines 23a and 24a, it being noted that the force 23a acts perpendicularly to the upper surface of the cap 18a and to the surface 21a of the way while the force 24a acts perpendicularly to the rear inclined surface of the way. The resultant force 23a is derived from the component forces 25a and 26a while the resultant force 24a is derived from the component forces 27a and 28a. The forces 25a and 27a act in planes parallel to the applied force 22a but in the opposite direction. It should be pointed out that the lines representing the applied, resultant and component forces are drawn to scale from a computation of these forces and it will be seen that the resultant force 23a acting through surface 21a and the upper surface of the gib is greater than the applied force 22a and hence will cause rapid wearing of the contacting surfaces. In addition, the resultant force 24a acting through the rear inclined surface of the way upon the slide produces wear between these contacting surfaces of the way and slide and such wear makes it necessary to refinish these contacting surfaces more frequently. It will also be noted the rear inclined side of the V-way 12a and the horizontal surface 21a on the underside of said way form the legs of an angle included between the dot and dash lines A and B. Due to the angularly disposed surfaces just referred to and to the similarly disposed contacting surfaces of the slide, the applied force acting substantially in the direction of line 22a causes a binding or gripping wedging contact between the way and the slide which may tend to lock the slide to the way and prevent free movement of the slide along the way.

The present invention contemplates a different arrangement than that shown in Fig. 2 and one wherein the slide is held in proper position relative to the rear way 12 by means of separately adjustable gibs 29 and 30 acting, respectively, against a vertical surface 31 at the rear side of the rear way and against a horizontal surface 32 on the underside of the rear way. The gib 29 is tapered and is mounted in a recess formed in the underside of the rear of the slide 13, with the tapered side of the gib contacting the slide 13 while the straight side of the gib contacts the vertical surface 31 of the rear way 12. An adjusting screw 33 is carried by the slide 13 and has a collar engaging in a recess formed in the gib 29, wherefore movement of the screw axially effects longitudinal adjusting movement of the gib 29 all as is well understood in the art. A cap 18 is bolted or otherwise secured to the underside of the rear of the slide 13 and projects beneath the surface 32 of the rear way 12 and is provided in its upper corner beneath the rear way with a recess in which is mounted the tapered gib 30 that can be adjusted by means of the adjusting screw 35. The cap 18 has a tapered surface contacting the lower tapered surface of the gib 30 and the straight surface of the gib 30 contacts the surface 32. It will be understood that the gib 30 as well as the gib 15 at the front of the bed are both adjusted by the adjusting screws 17 and 35, similarly to the adjustment imparted to the gib 29 by its adjusting screw 33. It will also be understood that when the gibs 15, 29 and 30 have been properly adjusted they are secured to the caps or slide by which they are carried by suitable securing means not shown but understood in the art.

Referring to Fig. 3, it will be seen that the applied force 22 which acts to tilt the slide 13 upwardly and forwardly off of the rear way 12 is restricted by forces 23 and 24 acting perpendicularly through the surfaces 32 and 31 against the gibs 30 and 29. The forces 23 and 24 are equal, respectively, to the components 36 and 37 of the applied force 22 and act in the opposite direction thereto in planes parallel therewith. Consequently there is a distribution of forces acting to resist the applied force in such manner as to obviate the binding or wedging action between the way and the slide and thus to provide for free movement of the slide on the way.

Although a preferred embodiment of the invention has been illustrated and described herein it will be understood that the invention is susceptible of various modifications and adaptations within the scope of the appended claims.

Having thus described my invention, I claim:

1. In a machine tool having a bed provided with a rear way, said rear way having its upper slide supporting side defined by angularly disposed inclined slide supporting surfaces, its rear side defined by a substantially vertical surface, and its underside adjacent the rear of the way by a substantially horizontal surface; a turret slide movable on said rear way and having contact with and supported by both of said angularly disposed supporting surfaces of the upper side of the rear way, a gib carried by said slide and engaging said substantially vertical surface at the rear side of said rear way, a cap carried by said slide and having a portion extending beneath said horizontal surface of the underside of said rear way, a second gib carried by said portion of said cap and located beneath and engaging said substantially horizontal surface on the underside of said rear way, the engagement of said gibs with said substantially vertical and horizontal surfaces of the rear way materially reducing the tendency of the slide to have a wedging or binding engagement with the upper side of the rear way and the underside thereof under the applied force due to the cutting action of the tool or tools carried by the slide and the slide can move more freely on said angularly disposed supporting surfaces of said way under load, and means for individually adjusting said gibs to compensate for wear and including an adjustable element for said first gib and carried by the slide, an adjustable element for said second gib and carried by the cap, said elements and said gibs having cooperating portions forming an operative connection therebetween.

2. In a machine tool having a bed provided with a rear way, said rear way having its upper slide supporting side defined by angularly disposed inclined slide supporting surfaces, its rear side defined by a substantially vertical surface, and its underside adjacent the rear of the way by a substantially horizontal surface; a turret slide movable on said rear way and having contact with and supported by both of said angularly disposed supporting surfaces of the upper side of the rear way and provided with a downwardly extended portion adjacent to but spaced rearwardly from said substantially vertical surface and with first means extending inwardly beneath but spaced downwardly from said horizontal surface of the underside of said rear way, a gib located in the space between said downwardly extended portion of said slide and said substantially vertical surface and adjustable laterally relative to said vertical surface into sliding engagement with the same; a separate and second gib located in the space between said first means and said substantially horizontal surface and adjustable vertically relative to said horizontal surface into sliding engagement therewith, the engagement of said gibs with said substantially vertical and horizontal surfaces of the rear way materially reducing the tendency of the slide to have a wedging or binding engagement with the upper side of the rear way and the under side thereof under the applied force due to the cutting action of the tool or tools carried by the slide and the slide can move more freely on said angularly disposed supporting surfaces of said way under load, and second means for individually adjusting said gibs to compensate for wear and including an adjustable element for said first gib and carried by the downwardly extended portion of the slide, an adjustable element for said second and separate gib and carried by said first means, said elements and said gibs having cooperating portions forming an operative connection therebetween.

MAX E. LANGE.

REFERENCES CITED

The following references are of record in the file of this patent:

UNITED STATES PATENTS

| Number | Name | Date |
|---|---|---|
| 2,111,096 | Fritzsch | Mar. 15, 1938 |
| 2,149,881 | Burrell | Mar. 7, 1939 |

FOREIGN PATENTS

| Number | Country | Date |
|---|---|---|
| 16,405 | Great Britain | 1901 |